(No Model.) 9 Sheets—Sheet 2.
A. B. FRENZEL.
VACUUM PAN.

No. 350,424. Patented Oct. 5, 1886.

Witnesses
F. L. Durand.
Henry C. Hazard.

Inventor
Arthur B. Frenzel
by Prindle and Russell
Attorneys (No Model.) 9 Sheets—Sheet 5.

A. B. FRENZEL.
VACUUM PAN.

No. 350,424. Patented Oct. 5, 1886.

Witnesses
F. L. Durand.
Henry C. Hazard.

Inventor
Arthur B. Frenzel
by Priddle & Russell
Attorneys.

(No Model.) 9 Sheets—Sheet 7.

A. B. FRENZEL.
VACUUM PAN.

No. 350,424. Patented Oct. 5, 1886.

Witnesses
F. L. Ourand
Henry C. Hazard.

Inventor
Arthur B. Frenzel
by Prindle & Russell
Attorneys (No Model.) 9 Sheets—Sheet 8.

A. B. FRENZEL.
VACUUM PAN.

No. 350,424. Patented Oct. 5, 1886.

(No Model.) 9 Sheets—Sheet 9.

A. B. FRENZEL.
VACUUM PAN.

No. 350,424. Patented Oct. 5, 1886.

Witnesses:
F. L. Durand.
Henry C. Hazard.

Inventor
Arthur B. Frenzel
by Prindle and Russell
Attorneys

UNITED STATES PATENT OFFICE.

ARTHUR B. FRENZEL, OF NEW YORK, N. Y., ASSIGNOR OF ONE-THIRD TO C. H. DELAMATER & CO., OF SAME PLACE.

VACUUM-PAN.

SPECIFICATION forming part of Letters Patent No. 350,424, dated October 5, 1886.

Application filed September 10, 1884. Renewed April 17, 1886. Serial No. 199,239. (No model.)

*To all whom it may concern:*

Be it known that I, ARTHUR B. FRENZEL, of New York, in the county of New York, and in the State of New York, have invented certain new and useful Improvements in Vacuum-Pans; and I do hereby declare that the following is a full, clear, and exact description thereof, reference being had to the accompanying drawings, in which—

Fig. 16, a similar view of a modified form of adjustable fastening for the scraper-knives.

Letters of like name and kind refer to like parts in each of the figures.

The object of my invention is to provide an improved apparatus for mixing and drying at high or low temperature, rendering and cooking under steam-pressure or in a vacuum, and cooling or chilling various substances; and to this end it consists in the construction, arrangement, and combination of parts, as hereinafter described, and more specifically pointed out in the claims.

In the drawings, A designates the main portion of my apparatus, which, as shown, is a cylindrical vessel with bottom B, and has on its top a dome-shaped cover, C. The sides of portion A, which is the pan proper, are, as shown, made double, the jacket-space D, between the inner wall, A', and the outer one, $A^2$, extending entirely around the pan. At one side of the pan a vertical partition, $a$, extends across the jacket-space, and on one side of this partition is an opening, $a'$, through the wall $A^2$, at or near the top of the jacket. A second opening, $a^2$, through the outer wall is situated on the other side of partition $a$ at the bottom of the space D. A pipe, $a^3$, serves to admit steam, hot or cold water, or hot or cold air through opening $a'$ into the space D, and a pipe, $a^4$, tapped into opening $a^2$ serves to draw off such air, steam, or water. As the discharge-opening is situated on the other side of the partition from the entrance-opening, the fluid or liquid flowing into the jacket must obviously pass entirely around the pan to find its exit through opening $a^2$ and pipe $a^4$. This pipe is placed low down, so as to draw off any moisture condensed from the air or steam used, and so as to insure thorough and uniform circulation of any liquid used in heating or cooling the pan and its contents.

At one side of the pan is a passage, $a^5$, extending through both walls of the pan and opening into the interior of the pan at the bottom thereof. This is for the purpose of drawing off the contents of the pan when it is used in treating any liquid substance. The outer end of this passage is screw-threaded, as shown, to allow of the connection therewith and fastening therein of a suitable valve stop-cock or screw-plug.

Where it is desired to positively draw off the contents of the pan, a pipe can be screwed into the opening or passage $a^5$ and connected with a suitable pump. The bottom B of the pan is flat, as shown, and, like the sides, is made double, so as to leave a jacket-space, B', between the plates $B^2$ and $B^3$, the latter of which is made of boiler-plate, preferably three-eighths of an inch thick.

Attached to or cast in one piece with the plate $B^2$, forming the bottom proper of the pan, are the two series of vertical flanges $b\ b$ and $b'\ b'$, which, as shown, run at right angles to each other. At their intersections are the downwardly-extending screw-threaded studs $b^2\ b^2$. These studs form bolts, which pass down through holes in the lower plate, $B^3$, and have upon them nuts $b^3$, which are screwed up against the under surface of plate $B^3$. The side wall of the jacket-space $B'$ is formed of an extension, $B^4$, of the outer wall, $A^2$, of the pan. This extension is provided with an annular horizontal flange, $b^4$, to which is fastened, by means of bolts $b^5$, the outer edge of the plate $B^3$. With the construction as above described the two plates $B^2$ and $B^3$ will obviously be most firmly and strongly braced and fastened together, and the jacket will be very strong and capable of standing great steam-pressure without danger of undue strain thereon.

To admit of a free circulation of steam, hot air, or heating or cooling liquid throughout the jacket, the flanges or ribs $b\ b$ and $b'\ b'$ are formed with openings $b^6\ b^6$, and between their points of intersection are cut away to leave spaces $b^7\ b^7$ between them and the lower plate, $B^3$.

Figure 1:
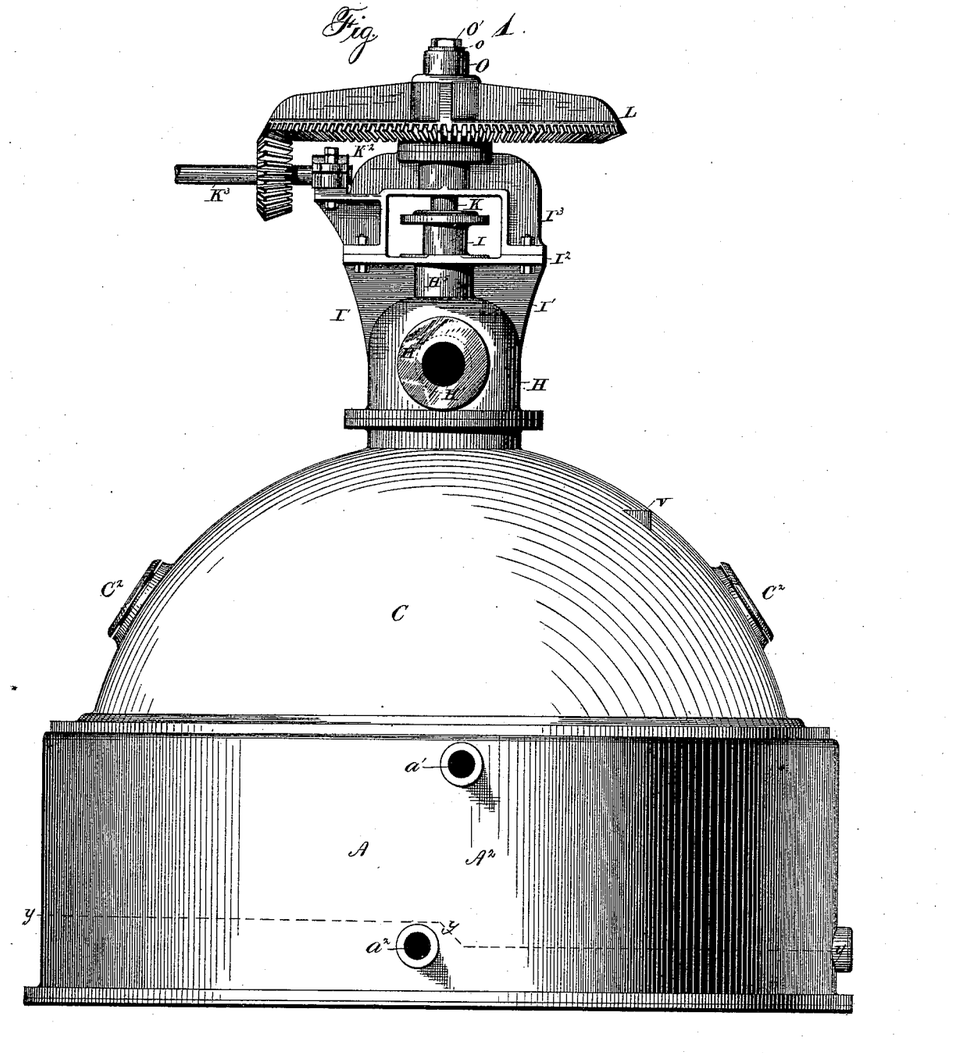
Figure 1 shows a view in side elevation of my vacuum-pan.
Figure 2:
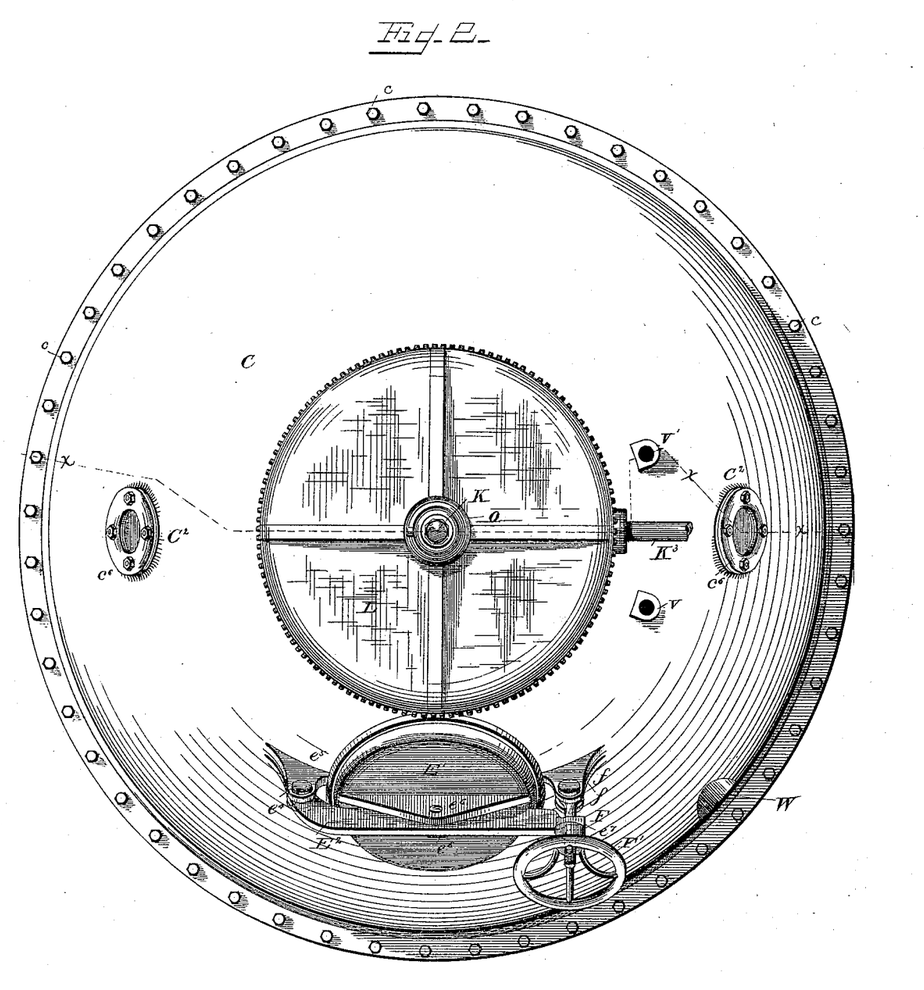
Fig. 2, a plan view of the same.
Figure 3:
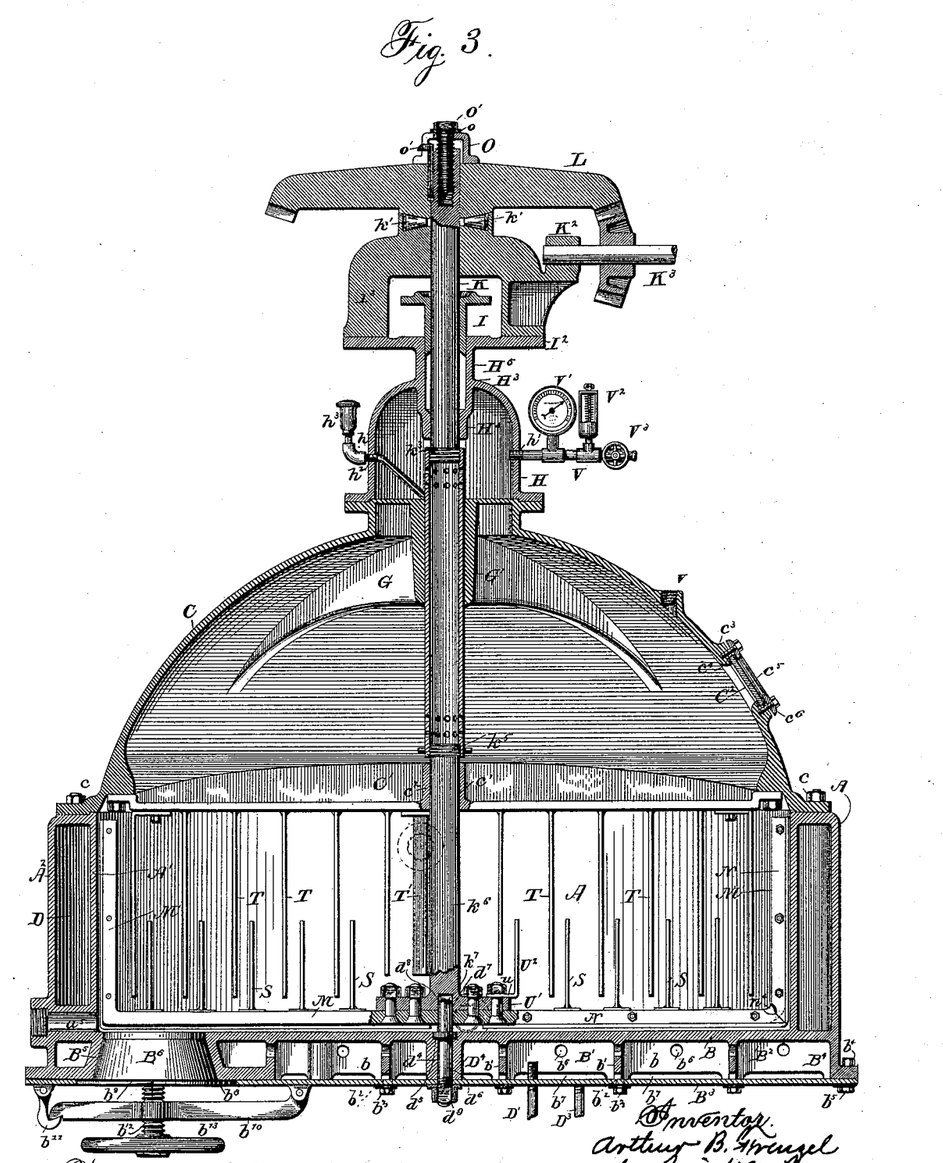
Fig. 3, a vertical section on line $x\ x$ of Fig. 2.
Figure 4:
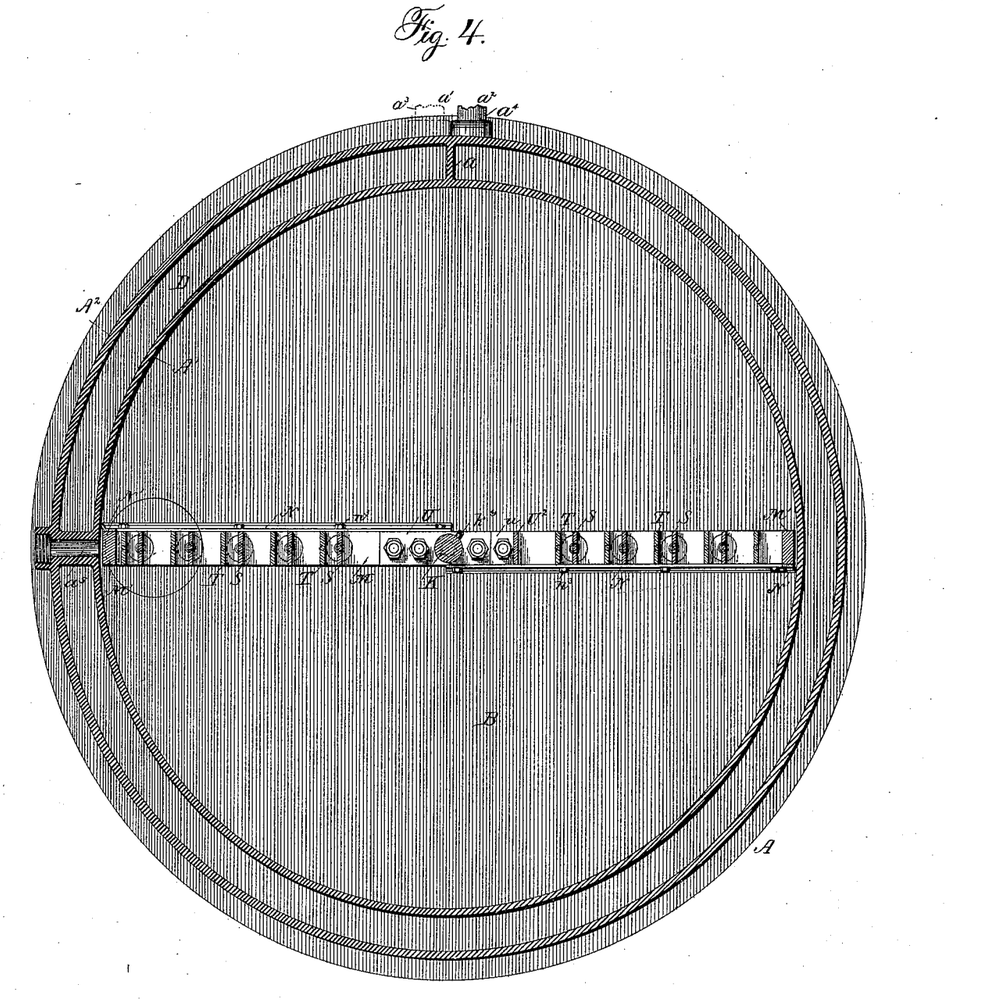
Fig. 4, a horizontal section of the pan on line $y\ y$ of Fig. 1.
Figure 5:
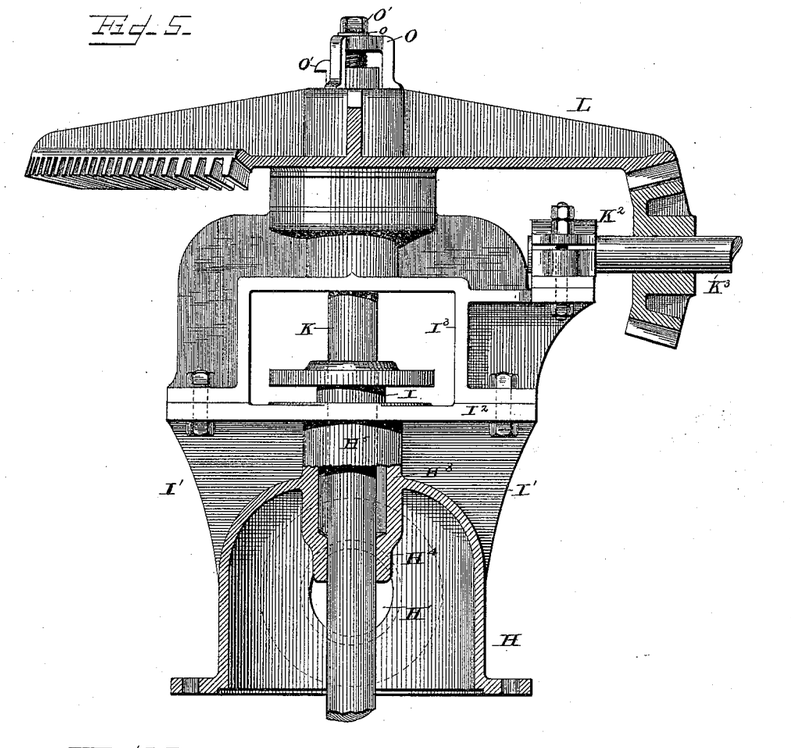
Fig. 5, a detail view showing in elevation the hood and gearing for driving the shaft, partly in section.
Figure 6:
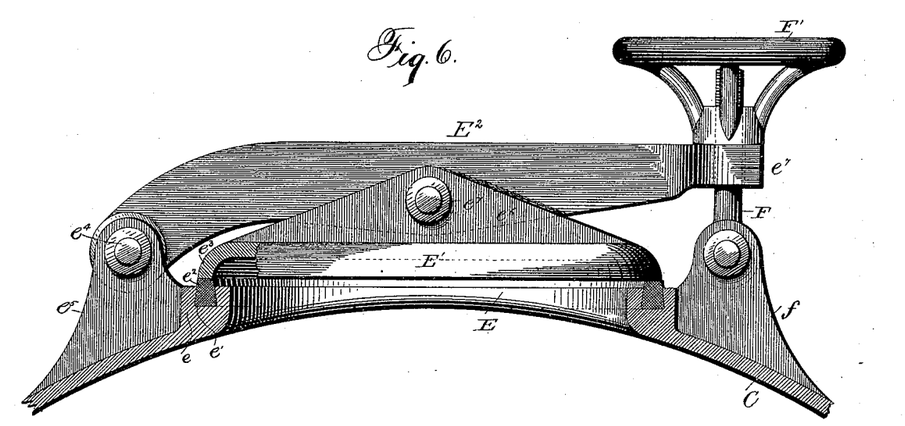
Fig. 6, a detail view in elevation of the means for fastening the man-hole cover in place.
Figure 7:
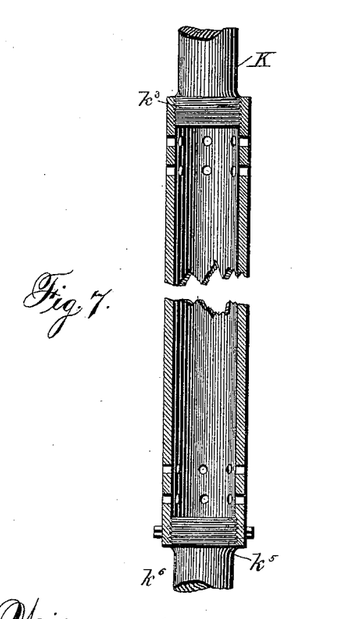
Fig. 7, a sectional detail view in elevation of the driving-shaft.

At one side of the pan, preferably the same at which is situated the opening or passage $a^5$, an opening, $B^5$, is made through the pan-bottom, extending down through both plates $B^2$ and $B^3$. Through plate $B^2$ it is cylindrical with vertical sides. Below this its walls $b^8$, which are between the two plates, flare outward and downward, as do its sides where it passes through plate $B^3$. There is no connection between jacket-space $B'$ and opening $B^5$, the walls $b^8$ separating the one from the other. Such opening or passage is for the purpose of allowing the discharge of the contents of the pan. It is closed by a stopper, $B^6$, which, when in place, is at its upper end flush with the upper surface of plate $B^2$. As shown in Fig. 3, this stopper is shaped to fit the opening closely. Around the base of the stopper is the horizontal flange $b^8$, on which is the elastic packing-ring $b^9$, which, when the stopper is forced up into place, is compressed between the flange and the bottom plate, $B^3$, to make a tight joint. To said plate, near the opening therein, is pivoted the lever $b^{10}$, as shown. This lever extends across the opening, and its end is adapted to be engaged by the hook $b^{11}$, pendent from said plate.

Through the lever $b^{10}$ is tapped the screw $b^{12}$, which at its lower end has the hand-wheel $b^{13}$, and at its upper end is swiveled in the bottom of stopper $B^6$. With this construction, if the lever be swung up with the stopper until its free end is engaged by the hook, the stopper can then be forced home into the opening $B^5$ by screwing up the screw $b^{12}$ by means of the hand-wheel. When the stopper is to be withdrawn, all that is necessary is to disengage the hook from the end of the lever, which is then free to swing down with the stopper.

As indicated in the drawings, there are two steam-inlet pipes, $D'$, which project up through the lower plate, $B^3$, their upper ends being at some distance above said plate, so that the moisture condensed in the jacket will be below them. The number of inlet steam-pipes can of course be increased or diminished, as desired. In plate $B^3$ there are also four outlet-openings, $D^2$, with which are connected outlet-pipes $D^3$, the upper ends of which are not flush with but below the upper surface of the plate. These pipes serve as an exit for the steam, and also draw off therewith any moisture or water or condensation collecting on the plate.

When steam is used in the jackets, it can be either live steam or the exhaust-steam from the pump which I use to draw off the vapors within the pan, as hereinafter described. Such pump in practice I have exhaust under ten pounds pressure. This steam enters each of the jackets through the inlet-pipes and passes out through the outlets, taking with it the water of condensation. At the outlet from each jacket I contemplate in practice placing a valve that will choke off the exhaust-steam from the steam end of the pump until it reaches the desired pressure. By regulating this valve I can carry from one to ten pounds pressure of steam in the jacket. Steel enters largely into the construction of the jacket, as, while it is a good conductor of heat, it can without great thickness withstand high pressure, and also resists very well the action and effect of vegetable and animal fats and acids.

Extending downward from the center of plate $B^2$ is the cylindrical projection $D^4$, through which and the plate is the bore or passage $d^4$, enlarged at its upper end to form the annular recess $d^5$. A bolt, $d^6$, having the flange or shoulder $d^7$ resting within this recess and carrying on its upper end the cylindrical steel pin $d^8$, projecting above plate $B^2$, extends down through that plate, projection $D^4$, and plate $B^3$, and on its lower threaded end has a nut, $d^9$, bearing against the latter plate, and, when screwed up, serving to seat the collar or flange $d^7$ and hold the bolt and pin firmly and rigidly in place in the vertical axial line of the pan.

Fastened to the top of the vertical walls of the pan by means of bolts $c\ c\ c$ is the dome-shaped cover or top $C$. To the inside of such dome, about on a level with the top of the vertical walls of the pan, is bolted at each end the cross-bar $C'$, extending diametrically across the pan. This bar is $\perp$-shaped in cross-section.

At its middle point, in the same vertical line with the central pin, $d^8$, just described, is the opening $c'$, extending up through a cylindrical portion, $c^2$. This opening is for the passage of the stirrer-shaft, to be hereinafter described.

The dome $C$ is provided with several openings, $C^2\ C^2$, of which two are shown in the drawings, for the purpose of allowing inspection of the contents of the pan during the process of treatment. Around each of these openings is an outwardly-extending annular flange or rib, $c^3$, formed with the rabbet or annular recess $c^4$, for the reception of the edge of the thick glass plate or disk $c^5$, which is held down in place and clamped in the recess by the ring $c^6$, screwed or bolted to the flange and overlapping the edge of said disk. A thin washer or ring of elastic packing is placed between the glass and the bottom of the recess of the flange, and also between it and the ring $c^6$.

A large opening, E, through the wall of the dome is for allowing the charge to be treated to be introduced into the pan. Around this opening is a raised rim or flange, $e$, in a dovetailed groove, $e'$, in which is placed an elastic packing-ring, $e^2$, upon which bears the rim or inturned edge $e^3$ of the cover E'. This cover is forced and held down upon the packing-ring to compress the same and make a tight joint by a lever, $E^2$. This lever is at one end hinged to the dome by means of the pin or bolt $e^4$, passing through the ears $e^5 e^5$ on the dome and the end of the lever. Lugs or ears $e^6 e^6$, extending from the top of cover E', are pivotally attached to the lever at about its middle point by a pin, $e^7$, passing through them and the lever.

Between lugs $f f$ on the dome, on the other side of opening E, is pivoted the lower end of the screw-link F, so that said arm can swing in the same plane with the lever. Upon the upper screw-threaded end of the link is the hand-nut F', adapted to bear down upon the forked end $e^8$ of the lever, which embraces the link and extends somewhat beyond it, as shown in the drawings. When this nut is screwed down so as to bear upon the lever, it will force and hold the attached cover E' home against its packing-ring, so as to close the opening tightly. To open or raise the cover the nut is screwed up until the link can be swung out between the ends of the fork on the lever, and the lever and cover are swung back.

On the inside of the upper portion of the dome, and extending at right angles to each other, are ribs G, at whose intersection is the hollow cylinder G', whose bore is in a line with that through the cross beam or bar C'. The bore or opening in this cylinder is continued upward through the dome-top, as shown in the drawings.

Upon the top of the dome, and surrounding this opening, is the hood H, bolted in place by bolts passing through abutting flanges on the dome and hood. At one side there is an opening, H', and pipe $H^2$, which latter is connected with a pump or suitable mechanism for exhausting the air and vapors from the hood, and so producing a partial vacuum in the chamber below, or for forcing air into the hood and chamber. The hood has at its top a neck, $H^3$, one portion, $H^4$, of which extends down into the hood, while the other portion, $H^5$, projects above the top of the hood, as shown. The lower end of the portion $H^4$ is bored vertically to receive and fit the shaft passing down through it. Throughout the rest of the neck the bore is enlarged, as shown, to receive the bushing I, which is bored to fit the shaft. Between the lower end of this bushing, which can be screwed or otherwise fastened in place, and the lower end of the enlarged portion of the neck-bore can be placed any suitable packing, to make a close bearing for the shaft and prevent the escape of any vapor from the interior of the hood up around the shaft.

Upon the outside of the top of the hood and the upper portion, $H^5$, of the neck $H^3$, diametrically opposite each other, are the flanges I' I', preferably cast in one piece with the hood and neck, and having cast upon their top the horizontal flat portion $I^2$. To this is bolted the ∩ shaped standard $I^3$, in the space between the legs of which is situated the flanged upper end of bushing I. The upper end of this standard is bored in a line with the bore of the neck already described, and up through it passes the stirrer-shaft K.

On top of the standard, and cast in one piece therewith, is the cylindrical cup K', surrounding the shaft-opening. The bottom of this cup slopes away on all sides from the opening, as shown at $k$ $k$, and upon it rest and roll the cones $k'$ $k'$, with their larger ends outward.

Upon the upper end of shaft K is keyed the large bevel gear-wheel L, which has its teeth on its under side, as shown. This wheel also on its under side, surrounding the shaft, has the hub L', corresponding in diameter with the cup K', and having its lower face made sloping upward and outward on all sides at $l$ $l$ from the shaft, so as to rest upon the upper sides of the cones $k'$ $k'$. The bottom of the bearing cup K' slopes at such an angle that the axes of the cones as they roll around thereon will be always in a horizontal plane. These cones and the beveled or sloping surfaces in the cup and on the hub of the gear-wheel form an anti-friction thrust-bearing to support the weight of the shaft, the gear-wheel, and the stirrer-arms on the lower end of the shaft, to be described hereinafter.

Upon one side of the standard $I^3$ is a journal bearing or box, $K^2$, for the end of the driving-shaft $K^3$, which carries the bevel-pinion meshing with wheel L, and is driven from any suitable motor. The shaft K, where it passes through the neck of the hood and above that point, is solid, as shown. Just below the neck, within the hood, it is formed with the enlarged screw-threaded portion or collar $k^3$, upon which is screwed the upper end of the tubular portion $k^4$ of the shaft. The shaft-opening through the top of the dome is of such size as to fit this tubular portion, which extends down into and within the dome to a point just above the cross-bar C', where it is screwed onto the enlarged upper end, $k^5$, of the lower solid portions of the shaft upon which the tubular portion is screwed. These prevent any turning of the different portions of the shafts independently of the others, so that a single rigid shaft is formed. The lower solid part, $k^6$, fits closely in the shaft-opening through bar C', and is thereby steadied. It is centered at its extreme lower end by the steel pin $d^8$, hereinbefore described, which projects up into the cylindrical socket or recess $k^7$ in the lower end of the shaft. To admit of lubricating the pin, if desired, a hole, $k^8$, is tapped through the shaft and closed by a small set-screw, $k^9$. This pin does not act as stop for the shaft, and does not support any of its weight. As set forth above, the cone-bearing of the shaft supports all the weight thereof. The pin acts only to center and steady the end of the shaft. This construction is desirable, as where, as has been done heretofore, the shaft is supported on a step in the middle of the bottom of the pan, too great strain is brought to bear on said bottom, and as the step is necessarily where the material being treated can get at it, it is impossible to keep it properly oiled, and it soon cuts and wears out.

My bearing for the end-thrust and weight of the shaft, gearing, and stirrers is above and outside of the pan, and entirely beyond the access even of the vapors from the pan. Screwed or otherwise fastened, if desired, upon the lower end of the shaft is the flat bar M, preferably of wrought-iron, which extends across just above and parallel to the plate $B^2$, forming the bottom of the pan, and at each end, close to the side of the pan, is turned up at a right angle. The vertical parts M' M' of the bar stand parallel with and close the pan-sides. Upon the horizontal portion of the bar are carried the scraper-knives N N, of steel, which are adapted to scrape up the material from the plate $B^2$, to prevent its sticking thereto. These knives, as shown, are attached to opposite sides of the bar, so that each one will be on the forward side of the arm of the bar to which it is attached with reference to the direction of the revolution of such arm. Each knife consists of the upright attaching portion $n$ and the downwardly-inclined sharp-edged part $n'$. The knife-back or attaching portion $n$ is provided with a series of holes, $n^2 n^2$, through which extend tap-bolts $n^3$, tapped into the side of the bar M. The holes $n^2 n^2$ are larger than the shanks of the bolts passing through them, so that when such bolts are loosened the knives can be moved and adjusted vertically or horizontally, as desired. If, then, the bolts are tightened up again, they will be fastened at the desired adjustment. The holes or openings $n^2 n^2$ are preferably somewhat elongated vertically, to allow of considerable adjustment in that direction.

To the vertical arms M' M' of the stirrer-bar M knives N' N' are attached in the same way, by tap-bolts passing through slots in their attaching portions. These knives are similar in shape to those already described, and are adapted to scrape or clear the sides of the pan, to prevent any of the material being treated from adhering thereto or remaining in contact therewith. At the angles between the vertical and horizontal portions of the stirrer-bar the knives, as shown, are mitered or beveled off correspondingly at $n^4 n^4$, so that their edges will extend downward and outward, respectively, to scrape and clear the whole extent of the side and bottom of the pan, and prevent any material remaining undisturbed in the angle between the side and bottom. When the knives have been adjusted, it may be necessary or desirable to bring the horizontal knives nearer to or farther from the bottom plate, $B^2$, without opening the pan or breaking the vacuum. If a films form on the plate, it is desirable to set the scraper-knives nearer the plate.

To enable adjustment of the stirrer-bar to be made without opening the machine, I make the shaft K adjustable up and down. Surrounding and extending above the upper end of the shaft is the cap O, resting upon the upper face of the bevel gear-wheel L, which, as already described hereinbefore, is supported below upon the anti-friction cone-bearing. Through a hole in the top of the cap the tap-bolt O' passes and screws into the top of the shaft. A washer, $o$, is placed upon the top of the cap, between the cap and the head of the bolt. If it is desired to raise or lower the shaft to adjust the stirrer-bar M, so as to bring its knives farther from or nearer to the plate $B^2$, the key $o'$ is loosened, and the bolt O' is turned so as to draw the shaft up through the gear-wheel or to let it down with reference to such wheel. When the shaft has been raised or lowered, as desired, the key is driven home again, and the shaft and wheel are thereby fixed together.

Instead of using the tap-bolt form of fastening for adjustably fixing the scraper-knives upon the stirrer arms, I contemplate using, if desired, a different form of fastening, consisting of a bolt, P, passing through the knife and arm, and bearing on its rear end a screw-nut, $p$, and washer $p'$, which can be, as shown, screwed up against the rear side of the arm. A split pin, $p^2$, can also be used to lock the nut in place.

For scraping or clearing the surface of the plate $B^2$ within the circle of rotation of the inner ends of the knives N N, I provide a short knife, R, which is fastened to the under side of the stirrer-bar, and extends outward in a radial line from the axial center of the shaft, extending toward the rear side of one of the arms of the stirrer-bar. This knife has the cylindrical shank or tang $r$, which fits into and is fastened in a socket in the stirrer-bar.

Upon the bar M are carried the upright flat bars S, which stand with their edges in the direction of the movement of the bars as they are carried around with the stirrer. These bars are provided with screw-threaded shanks or projections $s$ at their lower ends, which are screwed into the bar M, as shown. Between the lower ends of such bar S and the top of bar M is a copper washer, $s'$. A set-screw is tapped through the rear side of bar, and bears against the screw-shank s. With this construction the bars S S can obviously be set so that their flat faces shall stand at any desired angle to the tangent of their circle of travel, and the set-screws will then prevent any change of such angle.

Extending downward from the stationary cross-beam C' are the bars T T, which are shaped like bars S S, and are situated between such bars, as indicated in the drawings. The stirrer-bars S S preferably project about half-way up to the beam C', while the stationary bars project down so as to nearly touch the stirrer and scraper beam or bar. The bars T T are adjustably fastened into the beam at their upper ends by means of screw-shanks $t$ $t$ and set-screws $t'$ $t'$.

To the beam C' is fixed the stationary knife T', which stands parallel with shaft K, and has its edge $T^2$ close to the periphery of the same, so as to clear it of any material that otherwise might adhere to it. As shown, the blade stands at an angle to the diameter of the shaft, so as to act to greatest advantage as a scraper and clearer. The end bars of the series T T are attached to beam C' in a different way from the others. At their upper ends they are bent inward at right angles. Their horizontal portions are attached to the under side of the beam.

If desired, both the stationary and moving series of bars, or either of them, can be made with sharp cutting-edges on their forward sides.

Figure 8:
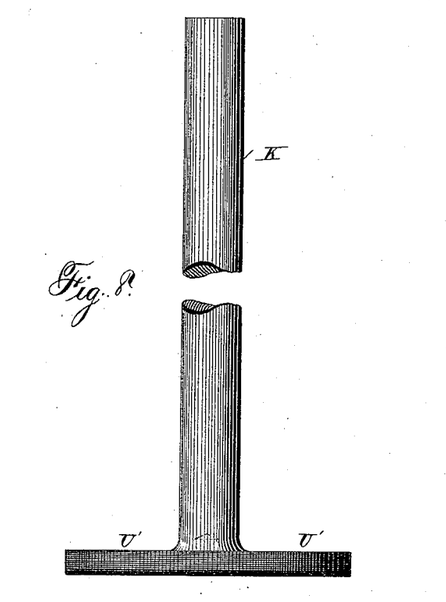
Fig. 8, a detail view in elevation of a modification thereof.
Figure 9:
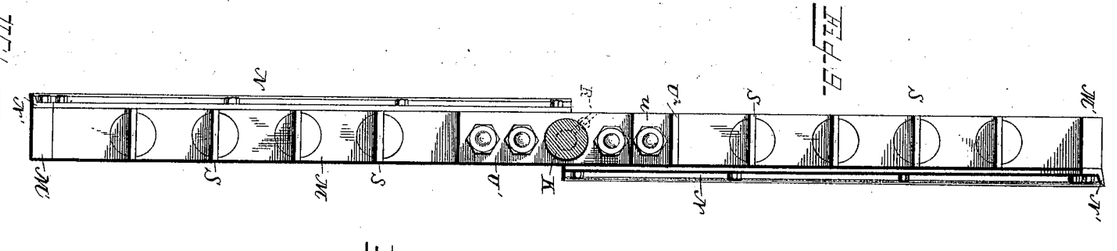
Fig. 9, a plan view of the stirrer and scraper.
Figure 10:
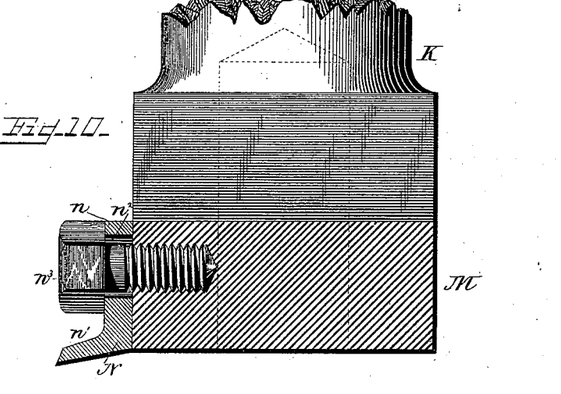
Fig. 10, a transverse sectional view of the stirrer with the scraping-knife attached.
Figure 11:
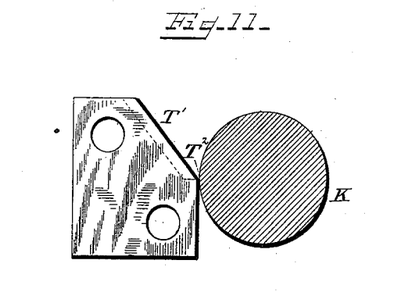
Fig. 11, a detail plan view of the knife for scraping the stirrer-shaft.
Figure 12:
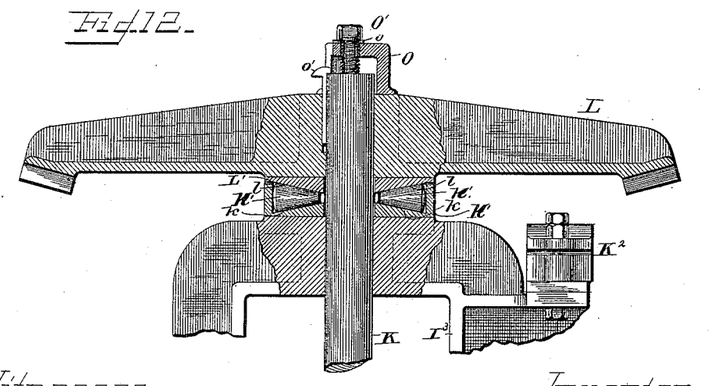
Fig. 12, a detail view of the anti-frictional supporting-bearing for the shaft.
Figure 13:
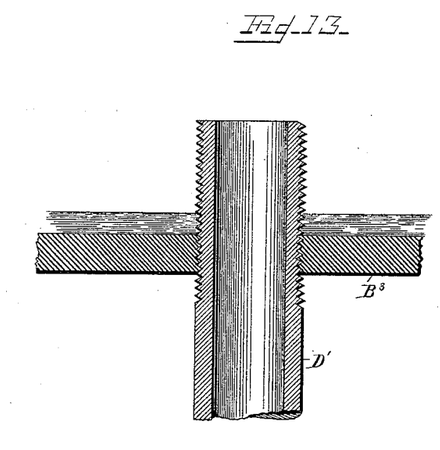
Fig. 13, a detail sectional view of a portion of the bottom of the pan, showing one of the pipes for admitting steam to the bottom jacket.
Figure 14:
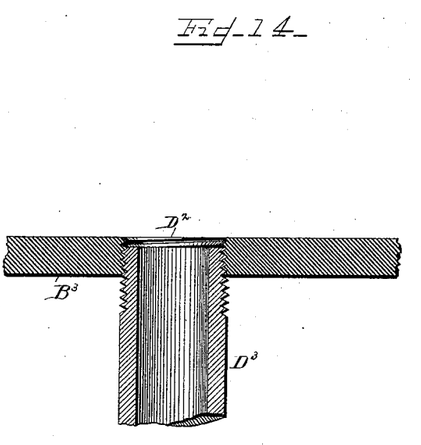
Fig. 14, a similar view showing one of the draw-off pipes for the bottom jacket.
Figure 15:
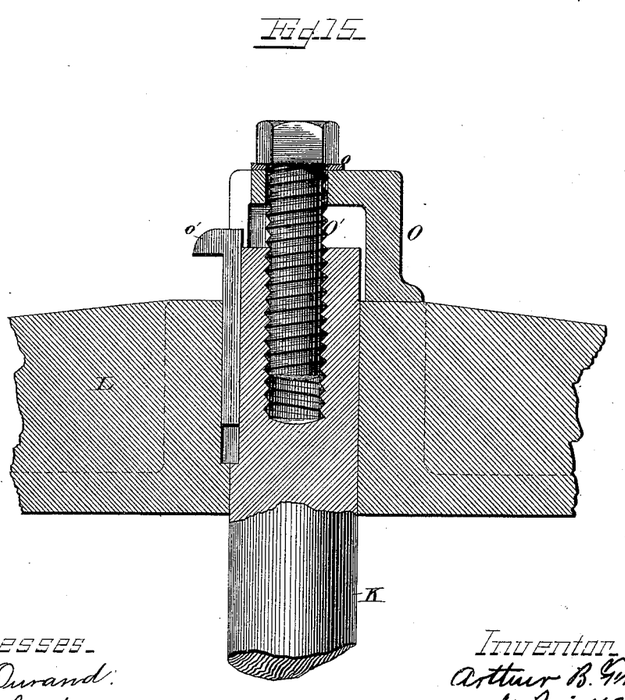
Fig. 15, a detail sectional view of the adjusting devices for the stirrer-shaft.
Figure 17:
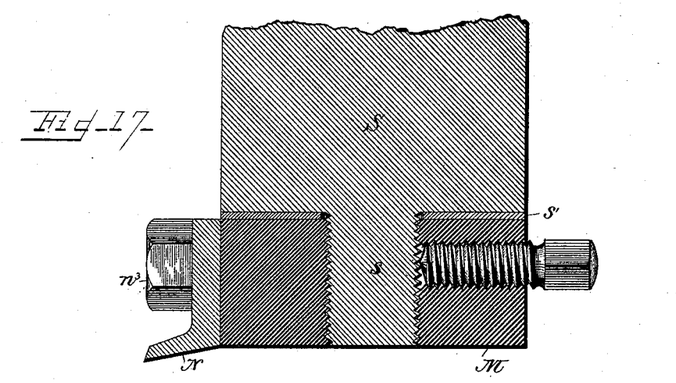
Fig. 17, a detail view showing the means and method of fastening the lower ends of the upright stirrer bars or knives in the revolving stirrer-arms.
Figure 18:
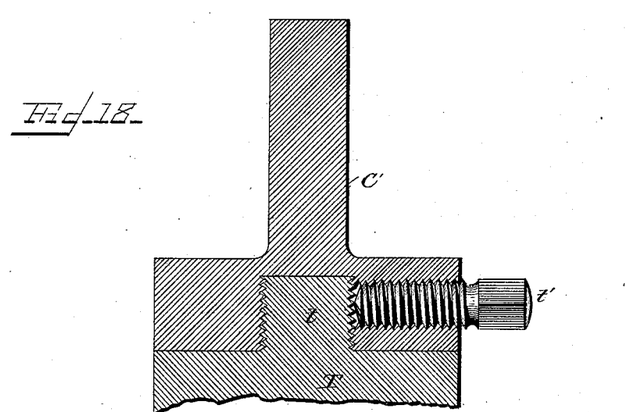
Fig. 18, a similar view showing the means and method of fastening the upper ends of the stationary bars in the cross-bar C', and Fig. 19 a detail sectional view showing the knife for scraping the bottom plate of the pan around the centering-pin.
Figure 19:
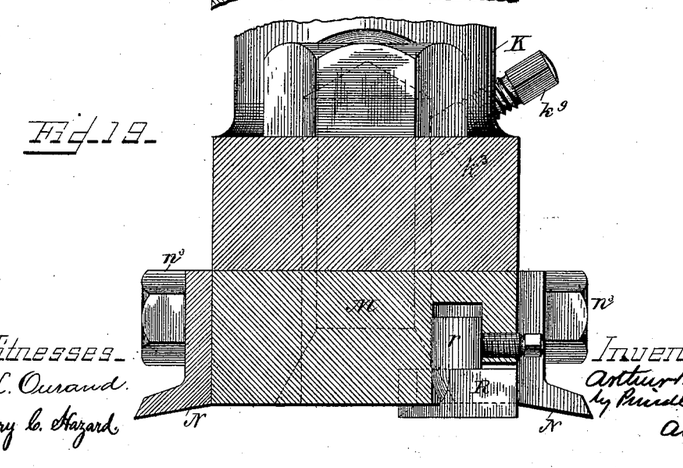

In Fig. 8 is shown a modified form of shaft and attachment of the stirrer-bar thereto. In this case the shaft is solid throughout. An opening, U, is left in the top of the dome around the neck through which the shaft passes. Through this opening the vapors within the pan and dome are drawn up into the hood and off through the discharge-pipe therefrom. The lower end of the shaft is provided with a flange, U' U', to which is bolted the stirrer and scraper bar. Upon one end of this flange is fixed, by means of one of the bolts used to fasten the stirrer-bar to the flange, the lower horizonal end, $u$, of an upright flat bar, $U^2$, which acts, like bars S S, as a stirrer.

Through the hood H are tapped openings $h$ and $h'$. The former is for a small pipe, $h'$, from an oil-cup, $h^3$. This pipe extends inward to oil the shaft, and can of course be used or not, as desired. When the oiler is not to be used, the opening can be closed with a screw-plug. The other opening, $h'$, is for the short pipe V, upon which is the pressure-gage V', and which beyond the gage is provided with a pop safety-valve, $V^2$, which can be set to blow off at a certain number of pounds of pressure. The pipe is also provided with a valve, $V^3$, which closes the blow-off opening from the pipe.

On the dome, above the sight-holes, are two tapped bosses, V V', the openings through which extend to the interior of the dome. One of the openings is for a thermometer and the other is for a vacuum-gage.

Near the lower edge of the dome is a tapped hole, W, which is for a pipe and valve, W' and $W^2$, respectively, for introducing liquids while the evaporating process is going on, and so making the process continuous.

I contemplate using with my vacuum-pan, as herein shown and described, a closed chamber beneath the pan for receiving the contents discharged from the pan, so that the dust from the dried material cannot reach the surrounding atmosphere.

The cross-bar for holding the stationary vertical bars within the pan may be made with two, three, or more radiating arms, so as to equalize the strain of driving the upright movable knives and stirrers between them. If desired, also, the stationary cross-bars can be placed so as to avoid the shaft. This is very desirable in treating heavy viscous fluids.

Having thus described my invention, what I claim is—

1. In a vacuum-pan provided with a jacket-space, the vertical partition extending across and dividing the jacket-space on one side of the pan, the steam-supply pipe entering the jacket on one side of the partition, and the discharge-pipe tapped into the space on the other side of the partition, all in combination, substantially as and for the purpose described.

2. The vacuum-pan provided with a jacket-space surrounding it, divided on one side by a vertical partition, with a steam-pipe entering the jacket-space at or near its top on one side of the partition, and with a discharge-pipe for drawing off the contents of the jacket-space situated on the other side of the partition at or near the bottom of the jacket, substantially as and for the purpose described.

3. The flat vacuum-pan bottom cast with series of intersecting vertical flanges formed with openings through them, cut away on their lower edges, except at their points of intersection, and there formed with downwardly-extending screw-studs, in combination with the boiler-iron plate fastened at its edge to a downwardly-extending rib or flange around the edge of the pan-bottom, and provided with openings to allow of the passage of the screw-studs, and nuts on the studs bearing against the lower side of the plate, substantially as shown and described.

4. The cylindrical vacuum-pan provided with a jacket around its sides, a flat horizontal bottom, and a jacket-space below that independent of the jacket-space around the sides of the pan, in combination with means for admitting steam to and drawing it off from such jackets continuously, substantially as and for the purpose described.

5. In combination with the stopper adapted to close the discharge-opening from the pan, the lever pivoted below at one side of the opening and adapted to be swung up to extend across the same, the hand-screw tapped through the lever and at its upper end swiveled in the stopper, and the hook adapted to engage and hold up the free end of the lever, substantially as shown and described.

6. As a means of seating and holding a stopper in place, the lever pivoted on one side of the opening to be stopped and adapted to be swung across such opening, in combination with the pivoted hook or latch for engaging and holding the outer end of the lever when it is so swung across the opening, and the screw tapped through the lever and carrying the stopper swiveled upon its end, substantially as shown and described.

7. In combination with the pan-bottom having the central downward projection and the central opening passing down through the bottom and projection and enlarged at its upper end, the centering-pin for the stirrer-shaft fitting into the opening, provided with a collar or flange fitting the enlarged upper end thereof, and screw-threaded at its lower end, and a nut on this threaded end, substantially as shown and described.

8. In combination with the pan-bottom having cast upon it the downward central projection and provided with a central opening extending down through it and the projection, the opening at its upper end being enlarged, the stirrer-shaft centering-pin provided with a collar or flange fitting the upper end of the opening, and having its shank extending down through the projection and the bottom plate, and the nut on the lower end of the pin bearing against the lower side of this plate, substantially as shown and described.

9. In a vacuum-pan, the vertical stirrer-shaft supported at or near its upper end by suitable anti-friction bearings, in combination with means for raising or lowering the shaft with reference to such bearings, substantially as shown and described.

10. In a vacuum-pan, in combination with the horizontal gear-wheel supported and rotating on suitable anti-friction bearings, the vertical stirrer-shaft extending at its upper end up through the wheel, means for causing the shaft to revolve with the wheel, and adjustable means for supporting the shaft from such wheel, substantially as and for the purpose described.

11. In combination with the gear-wheel supported upon suitable bearings, the vertical stirrer-shaft extending up into or through the central opening in the wheel, means for keying the wheel and shaft together, the inverted-cup-shaped piece resting upon the upper face of the wheel, and the screw-bolt extending down through this piece and tapped into the end of the shaft, substantially as and for the purpose described.

12. In combination with the horizontal gear-wheel supported in its rotation on suitable bearings, the stirrer-shaft passing at its upper end up through a central opening in the wheel, a removable key fitting in corresponding longitudinal grooves in the shaft and side of the gear-wheel opening, the inverted-cup-shaped piece resting on the upper face of the wheel and extending over the upper end of the shaft, provided with an opening to allow of removal or insertion of the key in place, and the screw having its head supported by the upper face of the cup-shaped piece, and its shank extending down through such piece and tapped into the shaft, substantially as and for the purpose set forth.

13. In a vacuum-pan provided with a hood separated from the pan from which the vapors are drawn off, the stirrer-shaft consisting of the solid upper and lower portions, and the tubular or hollow portion extending from the pan up into the hood, provided with openings through its walls at or near its upper and lower ends, substantially as and for the purpose described.

14. In a vacuum-pan which is provided with a hood from which the vapors are drawn off by suitable means, the stirrer-shaft consisting of the hollow portion, extending from the upper portion of the pan up into the hood, provided with openings at or near its lower end and in the portion within the hood, and of the upper and lower solid portions, the latter carrying the stirrers, and the former having attached to it the driving-gear, substantially as and for the purpose described.

15. The stirrer-shaft consisting of the upper solid portion, suitably journaled and supported, and provided with gearing or means for driving it, the lower solid portion carrying the stirrer-arms, and the middle hollow or tubular portion screwed onto the ends of the other portions, extending from the upper part of the pan up through the top into the hood, and provided at or near its upper and lower ends with openings through its walls, substantially as and for the purpose described.

16. In combination with the pan having the beam or bar extending transversely across its upper portion, the dome-shaped top, and the hood on top of the dome and separated from the interior of the latter, the stirrer-shaft consisting of the solid upper portion journaled in and supported from the top of the dome, the tubular portion screwed onto the lower end of such upper portion, extending down through an opening in the top of the dome to a point just above the beam within said dome, and provided at or near its upper and lower ends with series of openings, and the lower solid portion screwed into the lower end of this tube, passing down through a bearing in the beam, and carrying on its lower end the stirrers, substantially as shown and described.

17. In a vacuum-pan, in combination with the rotary stirrer-shaft, a scraper adapted to scrape the shaft above the stirrer-arms, substantially as shown and described.

18. In a vacuum-pan, in combination with the rotary stirrer-shaft, a fixed scraper-blade adapted to scrape and clear the shaft above the stirrers as it revolves, substantially as shown and described.

19. In a vacuum-pan, in combination with the rotary stirrer-shaft rotating in a bearing in a beam extending across the upper portion of the pan proper, the stationary scraper-blade attached at its upper end to the beam and extending down along the shaft, so as to clear it of adhering material, substantially as shown and described.

20. In a vacuum-pan, in combination with the shaft carrying the stirrer-arms, provided on their forward sides with suitable scraper-blades, the supplemental scraper-blade adapted to scrape the pan-bottom within the circle of travel of the inner ends of the blades on the arms, substantially as and for the purpose described.

21. In combination with the stirrer-shaft carrying on its lower end the bar forming the stirrer-arms, the scraper-blades on the forward sides of these arms for scraping up the material from the pan-bottom, the adjustable stirrer-blade carried on the bottom of the bar and adapted to scrape up and stir the material lying on the middle portion of the pan-bottom out of the reach of the inner ends of the main scraper-blades, substantially as shown and described.

22. In a vacuum-pan, in combination with the stirrer-shaft and the scraper-bar attached to the lower end thereof, the short scraper-blade for scraping the middle of the pan-bottom, having a shank entering a socket in the bar, and the set-screw adapted to fasten it there, substantially as and for the purpose described.

23. In combination with the cylindrical pan, the stirrer-shaft, the arms carried thereby extending out over and close to the pan-bottom and then upward close to the pan-sides, the adjustable scraping-blades fastened to the forward sides of the horizontal and vertical portions of the arms, substantially as and for the purpose described.

24. In combination with the cylindrical pan, the stirrer-shaft carrying arms extending out over and close to the pan-bottom, provided with adjustable scraper-blades on their forward sides, and with series of upright stirrer-blades on their upper sides, substantially as shown and described.

25. In combination with the arm extending out horizontally over the pan-bottom and then vertically close to the pan-side, the separate adjustable blades attached to the horizontal and vertical portions of the arm, respectively, substantially as shown and described.

26. In combination with the horizontal and vertical portions of the stirrer-arm, the separate adjustable blades, with their adjacent ends beveled or mitered, attached thereto by bolts or screws passing through enlarged holes in the blades, so that said blades can be adjusted to bring them nearer to or farther from the bottom and side, and to preserve the sharp corner at the point of contact of the ends of the blades, substantially as and for the purpose described.

27. In a vacuum-pan, a revolving stirrer-arm provided with a series of stirrer-blades projecting from the arm and adapted to be adjusted to vary the angles of the blades with reference to the circles of their revolution, substantially as and for the purpose described.

28. In combination with the revolving stirrer-arm, one or more blades or bars projecting from the arm in a direction substantially at right angles to the plane of revolution, attached at one end to the arm, so that they can be turned to adjust the blade or blades so that the sides thereof will stand at any desired angle with reference to the circle of travel, substantially as and for the purpose described.

29. In combination with the stirrer-arm, the vertical stirrer blades or bars attached at their lower ends to the bar by means allowing of their being turned and adjusted axially, substantially as and for the purpose described.

30. In combination with the stirrer-arms, the vertical stirrer blades or bars having their lower ends screw-threaded and tapped into the stirrer-arms, and set-screws tapped into the arms and engaging the screw ends of the blades or bars, substantially as and for the purpose described.

31. In combination with the stirrer-arms of a vacuum-pan, the upright stirrer blades or bars screwed at their lower ends into the arms, the soft-metal washers between the upper faces of the arms and the lower ends of the blades or bars, and set-screws adapted to engage the screw ends of the blades in the arms, substantially as and for the purpose set forth.

32. In a vacuum-pan, the bar or beam extending across the upper portion of the pan, provided with downwardly-extending bars or blades made axially adjustable, substantially as and for the purpose described.

33. In a vacuum-pan, in combination with the bar or beam extending across the pan, the downwardly-extending stationary bars having the central reduced screw-threaded portion at their upper ends tapped into the bar or beam, and set-screws adapted to engage these threaded upper ends, to prevent the blades or bars from turning when adjusted axially, substantially as and for the purpose described.

34. In a vacuum-pan, in combination with the stirrer arms provided with series of upright arms attached to the arms at their lower ends, so as to be axially adjustable, the stationary bar across the upper portion of the pan, provided with downwardly-projecting axially-adjustable blades or bars, so situated as to be between the circles of travel of the blades or bars on the revolving arms, substantially as and for the purpose described.

35. In combination with the stirrer-shaft, the gear-wheel attached to its upper end, having on its lower side around the shaft a hub whose lower face is beveled upward and outward, the cup on the stationary frame having its bottom beveled or sloping outward and downward from the shaft-opening through said bottom, and the conical anti-friction rollers in the cup supporting the beveled hub of the wheel, substantially as and for the purpose described.

In testimony that I claim the foregoing I have hereunto set my hand this 26th day of April, A. D. 1884.

ARTHUR B. FRENZEL.

Witnesses:
W. C. EARLE,
JNO. PEACOCK.